No. 804,189. PATENTED NOV. 7, 1905.
J. A. FLEMING.
APPARATUS FOR MEASURING THE LENGTH OF ELECTRIC WAVES.
APPLICATION FILED FEB. 8, 1905.
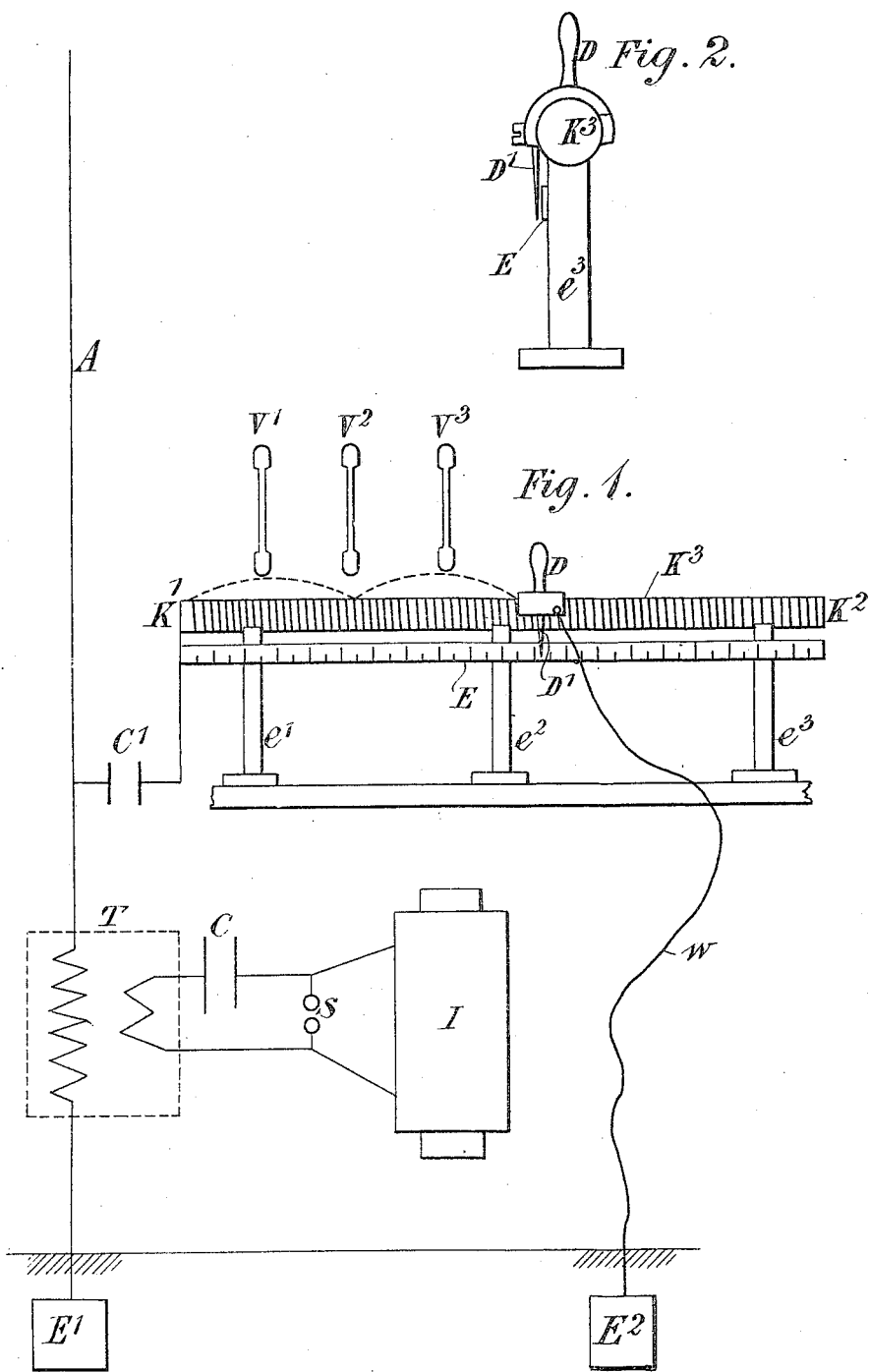

UNITED STATES PATENT OFFICE.

JOHN AMBROSE FLEMING, OF LONDON, ENGLAND, ASSIGNOR TO MARCONI'S WIRELESS TELEGRAPH COMPANY, LIMITED, OF LONDON, ENGLAND.

APPARATUS FOR MEASURING THE LENGTH OF ELECTRIC WAVES.

No. 804,189.   Specification of Letters Patent.   Patented Nov. 7, 1905.

Application filed February 8, 1905. Serial No. 244,713.

*To all whom it may concern:*

Be it known that I, JOHN AMBROSE FLEMING, professor of electrical engineering, a subject of the King of Great Britain, residing at University College, Gower street, London, in the county of Middlesex, England, have invented certain new and useful Improvements in Apparatus for Measuring the Length of Electric Waves, of which the following is a specification.

This invention has for its object improvements in apparatus for measuring the length of electric waves and especially of long waves such as are used in wireless telegraphy. For this purpose the waves to be measured are caused to induce other waves in a coil of wire means being provided for varying the operative length of this coil in such a manner that as nearly as possible one or more complete stationary waves are set up the length of the waves to be measured being deduced from the length of coil required for this purpose.

The invention also relates to a means for ascertaining when a complete stationary wave has been set up in the coil.

Figure 1 is a diagrammatic side elevation showing the apparatus applied to a wireless-telegraph transmitter and Fig. 2 is an end elevation to a larger scale of the apparatus.

The instrument consists of a long coil $K'K^2$ of a fine copper wire insulated with silk which is wound in one single layer in closely-adjacent turns on a rod $K^3$ of ebonite, glass or other highly-insulating material, ordinary wood is not suitable. The wire should be a rather fine silk-covered copper wire, preferably one about half a millimeter or less in diameter and I have used a wire of the size called "No. 32" or "No. 36" standard wire-gage. The diameter of the ebonite or insulating rod may be three or four centimeters, as found most convenient, and its length may be two or three meters in all. This long helix is supported on insulating-stands, such as $e'$ $e^2 e^3$, preferably of glass or ebonite, at a height of a couple of feet above the ground or table. One end $K'$ of this helix is connected to a metal plate which may be a square or circular metal disk, say six inches in diameter. This plate forms one of the plates of a small air-condenser $C'$. On the helix $K'K^2$ slides a metal saddle D padded with tin-foil or other flexible metallic material to cause it to make good contact with the surface of the insulated spiral wire. This saddle is connected by a stout wire $w$ with a good earth-plate $E^2$. The saddle D has an insulating-handle and fits closely on the helix $K'K^2$. The transmitter may be of any usual type, that shown consists of an induction-coil I which has its secondary terminals connected to a spark-gap S and the spark-balls are connected by a condenser C and by the primary coil of an air-core transformer T, the secondary circuit of which is inserted between an aerial wire A and an earth-plate $E'$. To some point on this aerial above the oscillation-transformer I, I connect a small plate of metal which may be square or round, say six inches in diameter. This plate, together with the corresponding plate at the end $K'$ of the helix $K'K^2$ forms an air-condenser $C'$. When the induction-coil is in operation, sparks pass at the gap S due to the discharge of the condenser C and these set up in the aerial wire A electrical oscillations having a certain frequency. To determine this frequency I employ a vacuum-tube of the kind ordinarily used in spectrum analysis, consisting of a slender glass tube ending in two bulbs. These tubes are filled with rarefied gas which may be carbonic-acid gas, hydrogen, helium, or neon, the latter giving particularly good results. It is also desirable that the glass should be made fluorescent by being impregnated with uranium.

The oscillations in the aerial wire A act through the condenser $C'$ upon the long helix $K'K^2$ and in accordance with well-known principles they set up in this helix stationary electric waves which travel along the helix with a certain velocity and are reflected at the saddle D. If the saddle D is moved to such a position that the distance $K'D$ is equal to one complete wave length of a stationary potential wave upon the helix, then if we hold the vacuum-tube above described at a point $V^2$ half-way between K and D it will not be illuminated because at that point the electric potential in the air near the spiral is extremely small, but if the vacuum-tube is held at points $V'$ or $V^3$ which are respectively one-fourth or three-fourths of the way from $K'D$ it will be brightly illuminated. If however the saddle D is placed at any other position which is not an exact wave length or multiple of the wave length then there will be no such regular distribution of potential but the vacuum-tube will either glow or not glow irregularly in any position. It is therefore possible to ascertain the length of an electric wave on the helix by the glow or the absence of glow in the vacuum-tube when held at these standard positions. If the helix is sufficiently long it is possible to so adjust the position of the saddle D that the distance K D shall be one complete wave length corresponding to the frequency of the oscillations set up in the aerial wire A. The velocity with which electric waves travel along the helix K' K² is measured by the reciprocal of the square root of the product of the capacity and inductance per unit of length of the helix, and these quantities, viz:—the capacity $c$ per unit of length of the helix with respect to the earth and the inductance $l$ per unit of length of the helix can be determined by methods which are known to every electrician, hence we can determine the velocity W with which the potential travels along the helix for $$W = \frac{1}{\sqrt{c\,l}}$$

Also if we call the wave length of the stationary wave on the helix, $\lambda$, and the frequency of the oscillations, $n$, then W, $n$ and $\lambda$ are connected by the following equation $$W = n\,\lambda = \frac{1}{\sqrt{c\,l}}$$

Hence from the computed value of W and the measured value of $\lambda$ we can determine the frequency of the oscillations $n$. But this frequency must be the frequency of the oscillations in the aerial A. If $A$ be the length of the electric wave radiated from the aerial A then $A$ is equal to the velocity of light divided by the frequency of the oscillations $n$.

Now the velocity of light is known to be $3 \times 10^{10}$ centimeters per second or one thousand million feet per second. Hence we obtain the following rule for measuring the wave length of the waves emitted by the aerial A. If, as stated, we call the length of this wave $A$ then we have the following equation for the determination of $A$ in terms of the observed stationary wave length $\lambda$ on the helix and the velocity of the wave along the helix which can be determined from measurement of its capacity and inductance per unit of length.

$$A = 1{,}000{,}000{,}000\,\lambda\,\sqrt{c\,l}\ \text{feet.}$$

In order to prevent the stationary waves on the helix from being disturbed by the electric waves passing through space which are radiated from the aerial it is generally necessary to interpose a large sheet of metal between the aerial and the helix K' K². This sheet of metal must have a hole cut in it, just large enough to have the end of the helix K' K² to pass through it and the sheet must also be connected to the earth. In place of a metallic plate, a sheet of metallic gauze may be used or even cloth or paper covered with tin-foil.

It is convenient to attach to the stands $e'\,e^2\,e^3$ a scale E and to the saddle D a pointer D' by which the distance of the saddle D from the end K' of the helix may be read off at once and this scale may be so divided as to show the length of the wave emitted by the aerial A directly in feet or meters.

What I claim is—

1. In an apparatus for measuring the lengths of electric waves, the combination of a coil of wire, the effective length of which may be varied, and an instrument movable with relation to the coil for indicating the presence of a complete stationary electric wave therein.

2. In an apparatus for measuring the lengths of electric waves, the combination of a coil of wire, the effective length of which may be varied, an instrument, movable with relation to the coil, for indicating the presence of a complete stationary electric wave therein, and an index of the length of the coil within which the complete stationary wave exists.

3. In an apparatus for measuring the lengths of electric waves, the combination of a coil of wire, the effective length of which may be varied, means for producing electrical oscillations in the coil, and means for ascertaining when a complete stationary wave has been set up in the coil.

4. In an apparatus for measuring the lengths of electric waves, the combination of a coil of wire, a conducting-saddle movable along the coil and connected to earth, means for producing electrical oscillations in the coil, and means for ascertaining when a complete stationary wave has been set up in the coil.

5. In an apparatus for measuring the lengths of electric waves, the combination of a coil of wire, means for varying the effective length of the coil, means for producing electrical oscillations in the coil, and a glow vessel, movable along the coil, for indicating when a complete stationary wave has been set up in the coil.

6. In an apparatus for measuring the lengths of electric waves, the combination of a coil of wire, a conducting-saddle movable along the coil and connected to earth, and a glow vessel, movable along the coil, for indicating when a complete stationary wave has been set up in the coil.

7. In an apparatus for measuring the lengths of electric waves, the combination of an apparatus for generating electrical oscillations, a coil of wire, a condenser, one plate of which is connected to the generator and the other to one end of the coil, means for varying the operative length of the coil, and means for ascertaining when a complete stationary wave has been set up in the coil.

8. In an apparatus for measuring the lengths of electric waves, the combination of an apparatus for generating electrical oscillations, a coil of wire, a condenser, one plate of which is connected to the generator and the other to one end of the coil, a conducting-saddle movable along the coil, and connected to earth, and means for ascertaining when a complete stationary wave has been set up in the coil.

9. In an apparatus for measuring the lengths of electric waves, the combination of an apparatus for generating electrical oscillations, a coil of wire, a condenser, one plate of which is connected to the generator and the other to one end of the coil, means for varying the operative length of the coil, and a glow vessel movable along the coil for indicating when a complete stationary electric wave has been set up in the coil.

10. In an apparatus for measuring the lengths of electric waves, the combination of an apparatus for generating electrical oscillations, a coil of wire, a condenser, one plate of which is connected to the generator and the other to one end of the coil, a conducting-saddle movable along the coil and connected to earth, and a glow vessel movable along the coil for indicating when a complete stationary electric wave has been set up in the coil.

11. An instrument for detecting electrical oscillations consisting of a glow vessel containing neon.

JOHN AMBROSE FLEMING.

Witnesses:
H. D. JAMESON,
F. L. RAND.